(12) United States Patent
Brauer et al.

(10) Patent No.: US 7,156,345 B2
(45) Date of Patent: Jan. 2, 2007

(54) MODULAR OVERHEAD STOWAGE BIN SYSTEMS AND ASSOCIATED METHODS

(75) Inventors: R. Klaus Brauer, Seattle, WA (US);
Paul J. Wilcynski, Seattle, WA (US);
Peter Guard, Sammamish, WA (US);
Richard Fraker, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/039,986

(22) Filed: Jan. 20, 2005

(65) Prior Publication Data

US 2005/0178906 A1   Aug. 18, 2005

Related U.S. Application Data

(62) Division of application No. 10/703,797, filed on Nov. 7, 2003, now Pat. No. 6,874,731.

(60) Provisional application No. 60/517,670, filed on Nov. 5, 2003.

(51) Int. Cl.
*B64D 11/06* (2006.01)
(52) U.S. Cl. .................................. 244/118.6
(58) Field of Classification Search ............. 244/118.5, 244/118.6; 105/315, 321, 375; 312/245
See application file for complete search history.

(56) References Cited

U.S. PATENT DOCUMENTS

| 5,383,628 A | 1/1995 | Harriehausen |
| 5,549,258 A | 8/1996 | Hart |
| 5,687,929 A | 11/1997 | Hart |
| 5,716,027 A | 2/1998 | Hart |
| 5,842,668 A | 12/1998 | Spencer |
| 5,938,149 A | 8/1999 | Terwesten |
| 6,318,671 B1 | 11/2001 | Schumacher |
| 6,874,731 B1 | 4/2005 | Brauer et al. |

FOREIGN PATENT DOCUMENTS

| EP | 0 731 021 B1 | 10/1988 |
| EP | 0 718 189 A1 | 6/1996 |
| EP | 0 722 404 | 7/1996 |
| EP | 0 930 229 A2 | 7/1999 |
| EP | 0 930 229 A3 | 7/1999 |
| EP | 0 861 781 B1 | 8/2003 |

*Primary Examiner*—Michael J Carone
*Assistant Examiner*—John A Radi
(74) *Attorney, Agent, or Firm*—Perkins Coie LLP

(57) ABSTRACT

A modular overhead stowage bin system has an outboard bin support and a center bin support coupleable to the fuselage. First and second stowage bin modules having different storage capacities are connectable to the outboard and center bin supports in first and second configurations. In a first configuration, the first and second stowage bin modules are coupled to the fuselage and have a first overhead aisle therebetween with first opposing edge portions. The first and second stowage bin modules in the second configuration are coupled to the fuselage and have a second overhead aisle therebetween. The second overhead aisle has second opposing edge portions each shifted laterally relative to the position of the first opposing edge portions of the first overhead aisle when the first and second stowage bin modules are in the first configuration.

8 Claims, 4 Drawing Sheets

MODULAR OVERHEAD STOWAGE BIN SYSTEMS AND ASSOCIATED METHODS

CROSS-REFERENCE TO RELATED APPLICATION

This application is a divisional of U.S. application Ser. No. 10/703,797, filed Nov. 7, 2003 now U.S. Pat. No. 6,874,731, which claims the benefit of U.S. Provisional Patent Application No. 60/517,670, filed on Nov. 5, 2003, entitled "MODULAR OVERHEAD STOWAGE BIN SYSTEMS AND ASSOCIATED METHODS" and which is hereby incorporated by reference in its entirety.

TECHNICAL FIELD

The following disclosure relates generally to aircraft stowage compartments and, more particularly, to overhead stowage bin systems in aircraft passenger cabins.

BACKGROUND

Aircraft passenger cabins generally include some form of overhead stowage bins that allow passengers to stow their carry-on luggage during a flight. The overhead stowage bins are typically arranged to include outboard stowage bins positioned on the left and right sides of a passenger cabin directly above the outboard seats. In multi-aisle aircraft, inboard stowage bins typically are positioned above the center seats. The stowage bins are often pivotally mounted to fixed support structures to be easily opened and closed by passengers. The outboard and inboard stowage bins are positioned to avoid interfering with the seat aisles through the passenger cabin, while allowing the passengers to open the bins and stow or remove their luggage when standing in the aisles adjacent to their seats.

Commercial airplanes typically have multiple passenger cabins with seats in a variety of seat-row arrangements to serve passengers with different requirements and fare potentials. For example, a business class or first class cabin typically will have a 2-2-2 seat-row arrangement, wherein there are two outboard seats on the left side of the fuselage, two center seats, and two outboard seats on the right side of the fuselage. The same aircraft also often has an economy class cabin with a 2-4-2 seat-row arrangement, wherein there are two left outboard seats, four center seats, and two right outboard seats. An economy class passenger cabin could have other seating configurations, such as a 3-2-3 seat-row arrangement, wherein there are three left outboard seats, two center seats, and three right outboard seats. The outboard seats in these different seating configurations are spaced laterally apart from the center seats to provide elongated aisles extending longitudinally through the passenger cabins. The aisles for each of the different seat-row arrangements typically are different widths or are in different lateral positions relative to the longitudinal centerline of the fuselage.

Conventional passenger aircraft of a common model typically have common stowage bin systems within the passenger cabins. The stowage bin systems typically have outboard and inboard stowage bins installed in a single, fixed configuration within the passenger cabin. The outboard and inboard stowage bins are spaced apart from each other so as to define one or more longitudinal overhead aisles through the passenger cabin.

Conventional overhead aisles, known as composite aisles, are designed to be wide enough so that any conventional seating configuration can be installed and so the seat aisles between the seats will be positioned below the composite aisles. For example, the same composite overhead aisle(s) is used in each aircraft independent of whether the seats are arranged in a 1-2-1 seat-row arrangement, 2-2-2 seat-row arrangement, a 2-4-2 seat-row arrangement, a 2-5-2 seat-row arrangement, a 3-2-3 seat-row arrangement, or other seat-row arrangements. The result of using a wide composite aisle, however, include loosing the ability to use some of the overhead space for stowage. Insufficient overhead stowage space can be a source of dissatisfaction for passengers, thereby detracting from the passengers' overall flying experience.

In conventional aircraft having a single-aisle seating arrangement, the passenger cabin typically is configured with a 2-2 seat-row arrangement (two seats on each side of the seat aisle), or a 2-3 seat-row arrangement (two seats on one side of the seat aisle and three seats on the other side). The overhead stowage bin systems used with the single-aisle seating arrangement typically are configured with a composite aisle that can accommodate both the 2-2 and 2-3 seat-row arrangements. In at least one conventional aircraft configured with a 2-3 seat-row arrangement, the overhead stowage bin system provides standard stowage bins, which are suitable for both the 2-3 and the 2-2 seat-row arrangements, over the set of two outboard seats, and larger stowage bins over the set of three outboard seats. The combination of larger and standard stowage bins on opposite sides of the overhead aisle provides for greater overhead stowage capacity as compared to the stowage capacity in a stowage bin system for a 2-2 seat-row arrangement. The increased overhead stowage capacity, however, typically requires a trade off with versatility to rearrange the passenger cabin with a different seat-row arrangement, such as the 2-2 seat-row arrangement.

SUMMARY

Aspects of embodiments of the invention are directed to modular stowage bin systems. One embodiment provides an overhead stowage bin system for use in an aircraft fuselage. The system includes first and second stowage bins coupleable to the fuselage. The second stowage bin has storage capacity different than a storage capacity of the first stowage bin.

The first and second stowage bins are configurable in first and second configurations. In the first configuration, the first and second stowage bins are laterally spaced apart from each other with a first overhead aisle therebetween. The first overhead aisle has first opposing edge portions spaced laterally apart from each other and from the sidewall portion of the fuselage. The first and second stowage bins in the second configuration are laterally spaced apart from each other with a second overhead aisle therebetween. The second overhead aisle has second opposing edge portions shifted laterally in the same direction relative to the position of the first opposing edge portions of the first overhead aisle when the first and second stowage bins are in the first configuration.

Another aspect of the invention includes a method of reconfiguring an interior of an aircraft fuselage. The method includes removing first stowage bin modules in a first configuration from a first bin support coupled to the aircraft fuselage. The first stowage bin modules have a first storage capacity. The method also includes removing second stowage bin modules in the first configuration from a second bin support coupled to the aircraft fuselage. The second stowage bin modules have a second capacity different than the first capacity. The second stowage bin modules in the first configuration are spaced laterally apart from the first stowage bin modules. A first overhead aisle is positioned between the first and second stowage bin modules, and the first overhead aisle has first opposing edge portions.

The method also includes attaching a plurality of first stowage bin modules to the second bin support in a second configuration, and attaching the plurality of second stowage bin modules to the first bin support in the second configuration. The second stowage bin modules are spaced laterally apart from the plurality of the first stowage bin modules. A second overhead aisle is positioned between the first and second stowage bin modules, and the second overhead aisle has second opposing edge portions shifted laterally in the same direction relative to the position of the first opposing edge portions of the first overhead aisle in the first configuration.

DETAILED DESCRIPTION

The following disclosure describes modular overhead stowage bin systems for use in an aircraft passenger cabin having a plurality of different seating configurations. Certain specific details are set forth in the following description and in FIGS. 1–4 to provide a thorough understanding of various aspects and embodiments of the invention. Other details describing the well-known structures and systems often associated with aircraft and, more specifically, with aircraft fuselages, stowage bins, and passenger seats, are not set forth in the following description to avoid unnecessarily obscuring the description of the various embodiments of the invention.

Many of the details, dimensions, and other specifications shown in the figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

Figure 1:
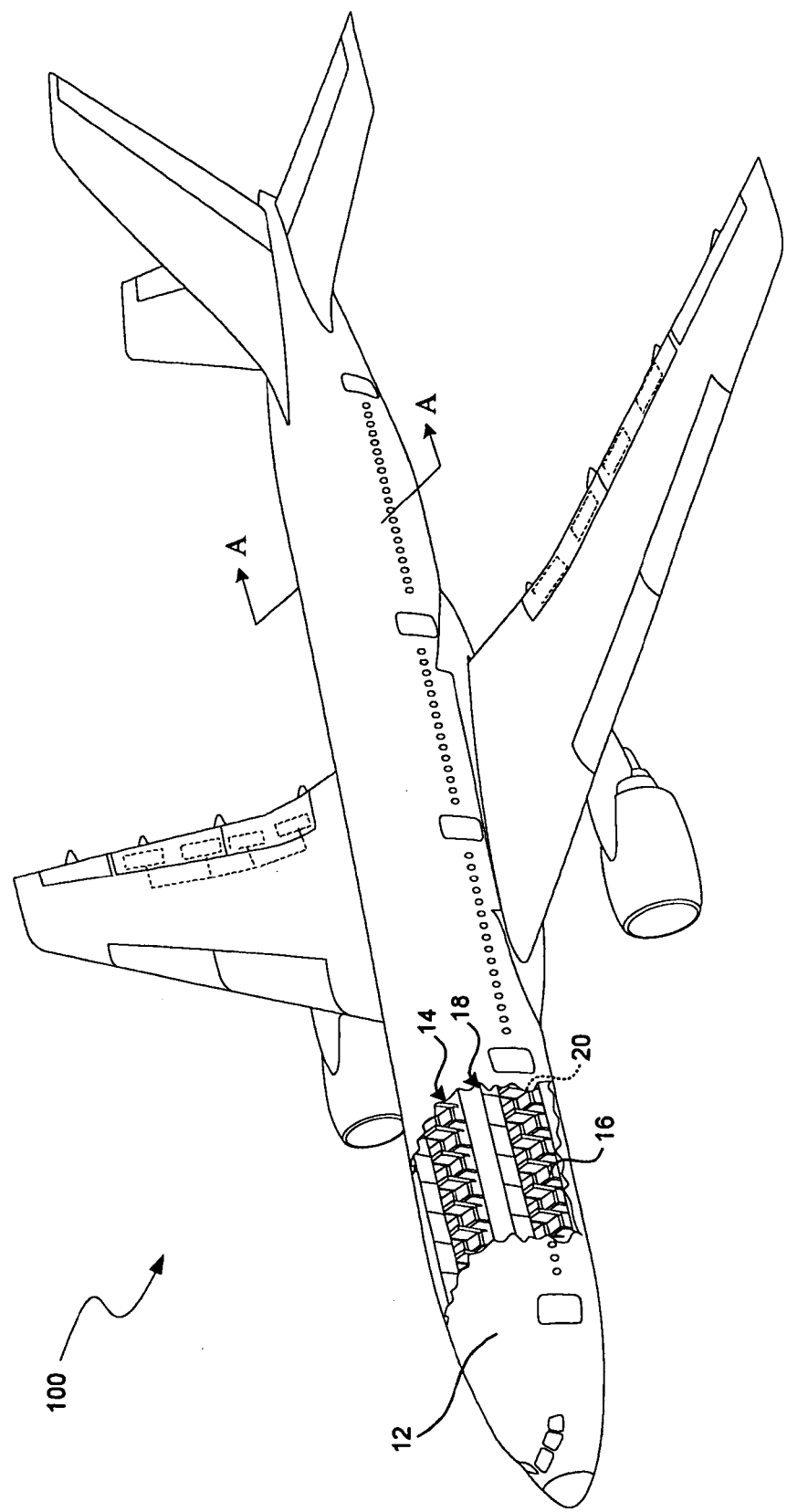
FIG. 1 is a top isometric view of an aircraft with a portion of a fuselage shown broken away and illustrating a modular overhead stowage bin system in accordance with one embodiment of the present invention.

FIG. 1 is a top isometric view of an aircraft 10 with a fuselage 12 (shown partially cut away) that contains a passenger cabin 14. A plurality of passenger seats 16 are arranged in a selected configuration in the passenger cabin 14. An overhead stowage bin system 18 in accordance with one embodiment of the present invention is positioned over the seats 16. The stowage bin system 18 is a modular, reconfigurable system that can be easily and economically reconfigured to provide different stowage bin arrangements to best accommodate different seating configurations in the passenger cabin 14.

Figure 2:
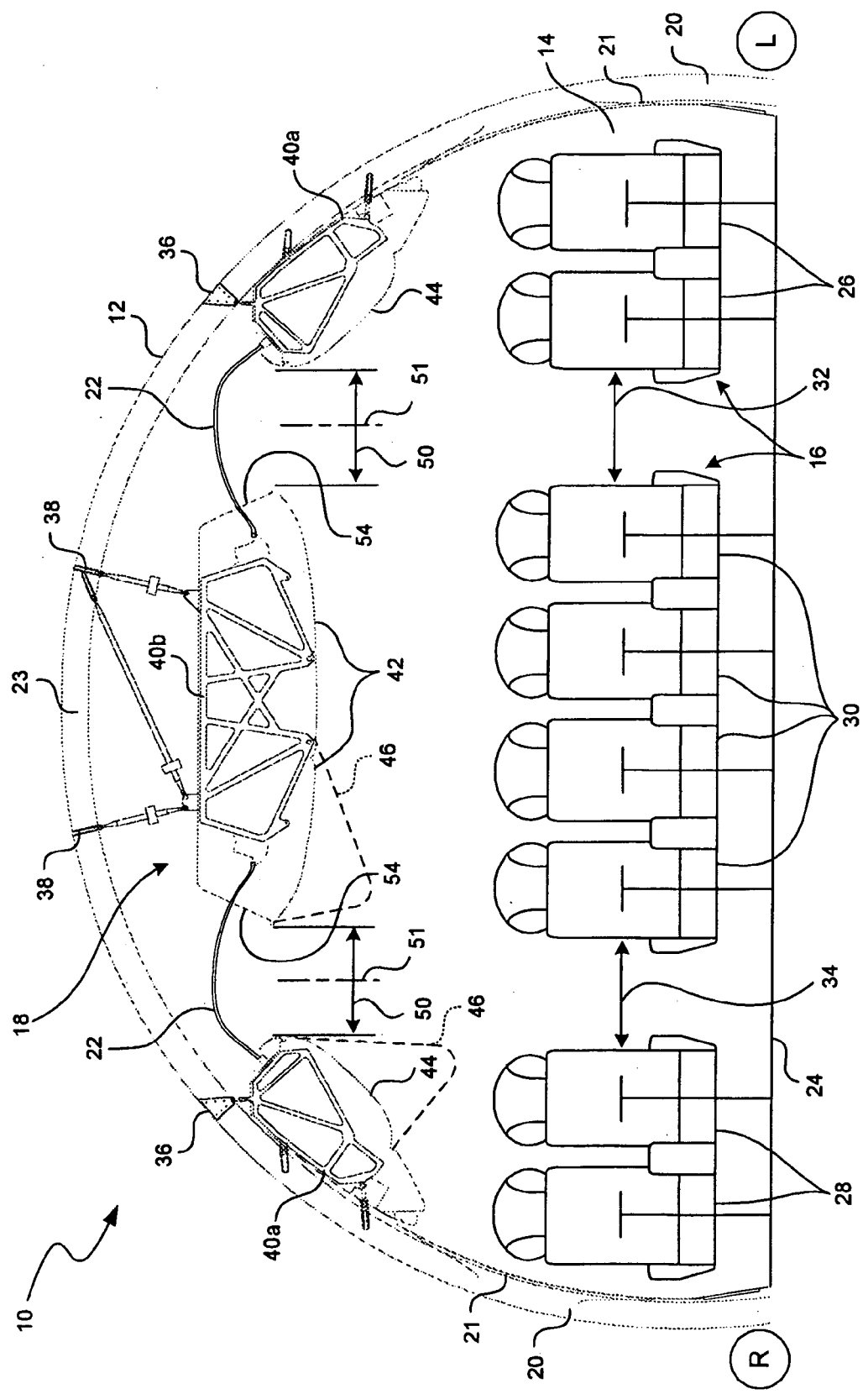
FIG. 2 is an enlarged partial cross-sectional view taken substantially along line A—A of FIG. 1, the modular overhead stowage bin system shown in a first configuration.

FIG. 2 is an enlarged partial cross-sectional view of the fuselage 12 taken substantially along line A—A of FIG. 1 showing the passenger cabin 14 with the stowage bin system 18 in a first configuration above the seats 16. In this illustrated embodiment, the fuselage 12 has sidewall portions 20 and curved sidewall panels 21 coupled to the sidewall portions outboard of the seats 16. Ceiling panels 22 are coupled to the fuselage 12 below a central portion 23 of the fuselage. The ceiling panels 22 generally extend between upper portions of the sidewall panels 21.

A floor structure 24 is coupled to the fuselage 12 and extends between the sidewall panels 21. The seats 16 are removably anchored to the floor 24 in a selected seating configuration. In the illustrated embodiment, the seats 16 are arranged in a 2-4-2 seat-row arrangement, with two left outboard seats 26 adjacent to the sidewall panels 21 on the left side of the fuselage 12, two right outboard seats 28 adjacent to the sidewall panels on the right side of the fuselage, and four center seats 30 between the right and left outboard seats. In another embodiment, the seats can be arranged in a 2-5-2 seat-row arrangement. The 2-4-2 and 2-5-2 seat-row arrangements are typical seating configurations used for an economy class passenger cabin 14.

The center seats 30 are spaced apart from the left, outboard seats 26 to define a left seat aisle 32, and the center seats are spaced apart from the right outboard seats 28 to define a right seat aisle 34. The left and right seat aisles 32 and 34 are each sized to meet or exceed Federal Aviation Regulations to provide clear pathways extending longitudinally through the passenger cabin 14.

The stowage bin system 18 is positioned over the seats 16 in a manner that provides reconfigurable overhead aisles above the left and right seat aisles. In the illustrated embodiment, the stowage bin system 18 includes outboard bin supports 36 coupled to the fuselage 12 generally above the left and right outboard seats 26 and 28. The stowage bin system 18 also includes a center bin support 38 coupled to the fuselage 12 and positioned generally above the center seats 30. Each of the outboard and center bin supports 36 and 38 are configured to removably retain modular overhead stowage bin assemblies 40. The outboard and center bin supports 36 and 38 in one embodiment include elongated, generally horizontal, frame-like structures. In other embodiments, the outboard and center bin supports 36 and 38 include a plurality of connection members securely attached to structural supports that define portions of the fuselage.

The stowage bin assemblies 40 connected to the outboard bin supports 36 are referred to herein as outboard stowage bin assemblies 40a, and the stowage bin assemblies connected to the center bin support 38 are referred to herein as center stowage bin assemblies 40b. The outboard stowage bin assemblies 40a are laterally spaced apart from the center stowage bin assemblies 40b to define two overhead aisles 50 generally above the left and right seat aisles 32 and 34, as discussed in greater detail below.

The bin assemblies 40 of the illustrated embodiment include two differently sized bin modules, namely, large bin modules 42 and small bin modules 44. Each of the large and small bin modules 42 and 44 are interchangeably connectable to the outboard bin supports 36 and to the center bin support 38. The positions of the large and small bin modules 42 and 44 in the passenger cabin depend, in part, upon the seating arrangements. Accordingly, the outboard stowage bin assemblies 40a can include either the large bin modules 42, the small bin modules 44, or both. Similarly, the center stowage bin assemblies 40b can include either the large bin modules 42, the small bin modules 44, or both.

Each of the large and small bin modules 42 and 44 can include a bin bucket 46 that defines a stowage capacity. The small bin modules 44 have bin buckets 46 with smaller stowage capacities than the stowage capacities in the bin buckets of the large bin modules 42. The large and small bin modules 42 and 44 are configured to allow the bin buckets 46 to pivot relative to the outboard or center bin supports 36 and 38 between open and closed positions. When the large and small bin modules 42 and 44 are in the open position, passengers can place luggage or other articles into the bin bucket 46 for overhead storage above the seats 16. When the large and small bin modules 42 and 44 are in the closed position, they are latched closed so the contents are securely and safely retained until the bin modules are unlatched and moved back to the open position.

In the embodiment illustrated in FIG. 2, the seats 16 are arranged in a 2-4-2 seat-row configuration, and a plurality of the small bin modules 44 are connected to the outboard bin supports 36 above the left and right outboard seats 26 and 28. A plurality of the large bin modules 42 are connected to the center bin support 38 above the center seats 30. Accordingly, the outboard stowage bin assemblies 40a include the small bin modules 44, and the inboard stowage bin assemblies 40b include the large bin modules 42. In the illustrated embodiment, pairs of the large bin modules 42 are provided along the center bin support 38, with the large bin modules in each pair facing outwardly in opposite directions.

The overhead aisles 50 in the illustrated embodiment extend longitudinally through the fuselage 12 between the outboard bin modules 40a and the inboard bin modules 40b. Each overhead aisle 50 has an aisle centerline 51, an outboard edge portion 52 defined at least approximately by the faces of the small bin modules 44 and an inboard edge portion 54 defined at least approximately by the faces of the large bin modules 42. The width of each overhead aisle 50 between the outboard and inboard edge portions 52 and 54 is aligned to function for the 2-4-2 seat-row arrangement to provide adequate space for passenger ingress and egress along the left and right seat aisles 32 and 34 without overhead interference. The width of each overhead aisle 50 in the illustrated embodiment is also suitable for use with a 1-2-1 and a 2-5-2 seat-row arrangement. The overhead aisle 50 is sized to allow enough space for movement of luggage or other articles into or out of the outboard and inboard stowage bin assemblies 40a and 40b.

Figure 3:
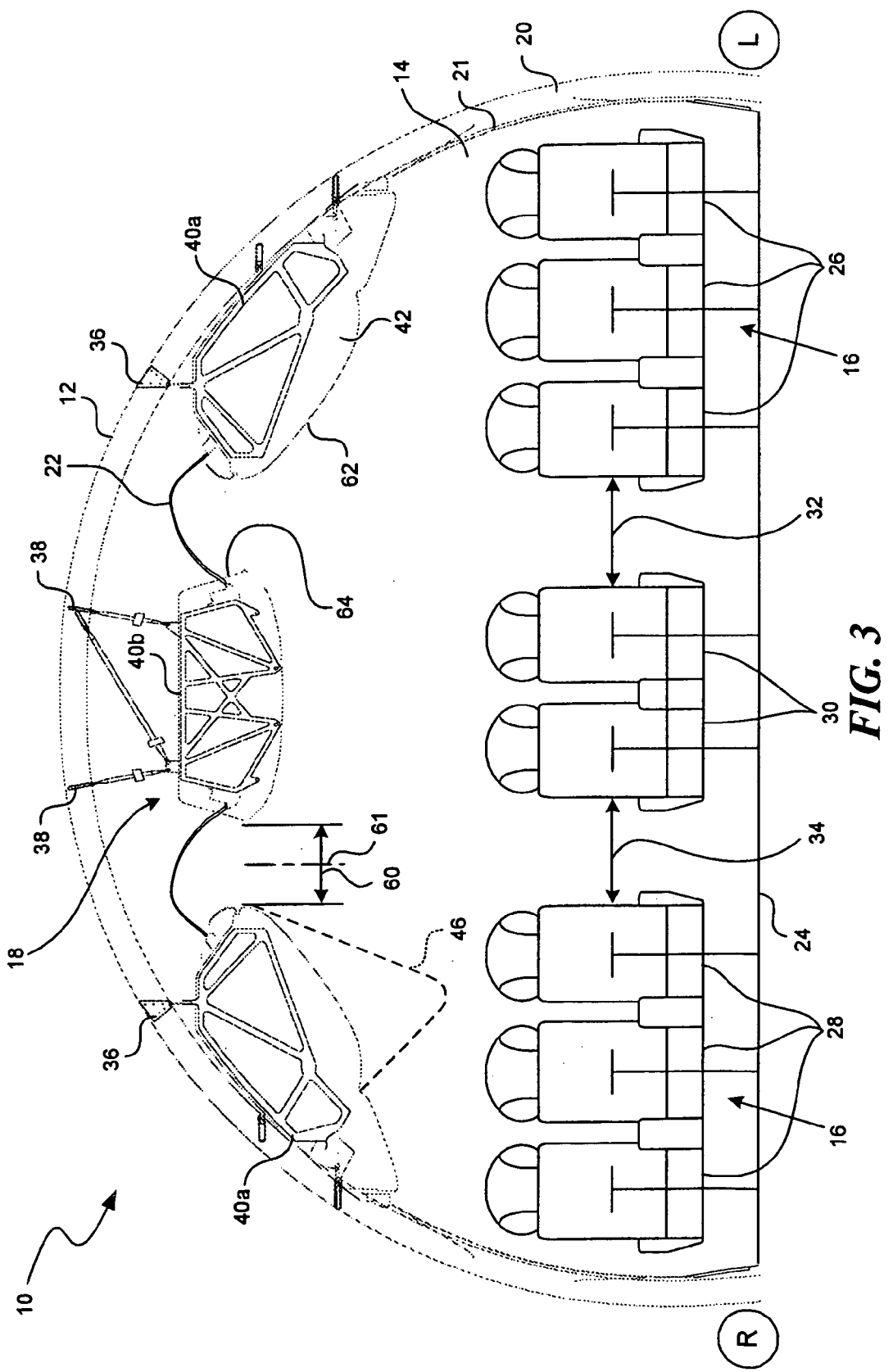
FIG. 3 is an enlarged partial cross-sectional view similar to FIG. 2 with the modular overhead stowage bin system shown in a second configuration.

FIG. 3 is an enlarged partial cross-sectional view similar to FIG. 2 but with the stowage bin system 18 shown in a second configuration. The seats 16 are positioned in the 3-2-3 seat-row arrangement, which defines the left and right seat aisles 32 and 34 between the center seats 30 and each of the left and right outboard seats 26 and 28. The lateral position of the left and right seat aisles 32 and 34 is shifted inboard as compared to the lateral position of the left and right seat aisles in the first configuration (FIG. 2), wherein the seats 16 are positioned in the 2-4-2 seat-row arrangement, as described above and shown in FIG. 2.

In this second configuration, the outboard stowage bin assemblies 40a include a plurality of the large bin modules 42 connected to the outboard bin supports 36 above the left and right outboard seats 26 and 28. The inboard stowage bin assemblies 40b include a plurality of the small bin modules 44 attached to the center bin support 38 above the center seats 30. Accordingly, the positions of the large and small bin modules 42 and 44 in this embodiment are reversed from the first configuration discussed above and illustrated in FIG. 2.

The large and small bin modules 42 and 44 are laterally spaced apart to define overhead aisles 60 above the left and right seat aisles 32 and 34. Each overhead aisle 60 has an aisle centerline 61, an outboard edge portion 62 defined at least approximately by the faces of the outboard large bin modules 42, and an inboard edge portion 64 defined at least approximately by the faces of the inboard small bin modules 44. The width of the overhead aisles 60 in this second configuration is at least approximately the same as the width of the overhead aisles 50 in the first configuration described above and illustrated in FIG. 2. The position of the overhead aisles 60, however, are shifted laterally in the inboard direction as compared to the position of the overhead aisles 50 in the first configuration. Accordingly, the position of the aisle centerline 51 in the first configuration shifts laterally to the position of the aisle centerline 61 in the second configuration. Similarly, both the outboard and inboard edge portions 62 and 64 move laterally in the same direction (e.g. inboard) as compared to the position of the corresponding outboard and inboard edge portions 52 and 54 of the overhead aisles 50 in the first configuration.

The lateral shift of each overhead aisle 60 generally corresponds to the lateral shift of the left and right seat aisles 32 and 34 that occurred when the seating configuration is changed from the 2-4-2 or 2-5-2 seat-row arrangement (FIG. 2) to the 3-2-3 seat-row arrangement (FIG. 3) or a 3-3-3 seat-row arrangement. Accordingly, the stowage bin system 18 provides for reconfiguration of the modular bin assemblies 40 to provide overhead aisles in different lateral positions and/or different sizes to accommodate different seating configurations without requiring a single "composite aisle" for all seating arrangements. As a result, the amount of overhead stowage space for use by the passengers can be higher than it is for conventional arrangements, even when the seating configuration in the passenger cabin 14 is changed.

The stowage bin system 18 illustrated in FIG. 3 has the large bin modules 42 outboard over the outboard seats 26 and 28 and the small bin modules 44 inboard over the center seats 30 in the 3-2-3 seat-row arrangement. The dimensions and range of motion of the large and small bin modules 42 and 44 in the illustrated embodiment are optimized so the resulting overhead aisles 60 between the large and small bin modules are in positions also well-suited for seats 16 configured in a 2-1-2, 2-2-2, or 3-3-3 seat-row arrangement. Accordingly, the configuration of the stowage bin system 18 does not need to change for every different seating arrangement, while still being able to provide ample available overhead storage in the passenger cabin 14 for the passengers and crew.

In the configurations illustrated in FIG. 2 and FIG. 3, the stowage bin assemblies 40a and 40b have bin modules 42 and 44 of only two different sizes. In other embodiments, the stowage bin assemblies 40a and 40b can have interchangeable bin modules with more than two different sizes that can connect to the outboard and center bin supports 36 and 38. In one embodiment, the stowage bin system 18 in the first configuration has a first set of small bin modules 44 positioned over the left and right outboard seats 26 and 28, and a first set of large bin modules 42 positioned over the center seats 30. In the second configuration, a second set of small bin modules 44 are positioned over the center seats 30, and a second set of large bin modules 42 are positioned over the left and right outboard seats 26 and 28. Each of the first and second sets of small bin modules 44 can include different bin modules not used in the other set. In another embodiment, some or all of the small bin modules 44 in the first set can be included in the second set of small bin modules. Similarly, each of the first and second sets of large bin modules 42 can include different bin modules not used in the other set. In another embodiment, some or all of the large bin modules 42 in the first set can be included in the second set of large bin modules. The interchangeability of the stowage bin assemblies 40a and 40b on the outboard and center bin supports 36 and 38 provides significant flexibility to accommodate the overhead stowage needs associated with different seating arrangements in the passenger cabin 14. Accordingly, the stowage bin system 18 is not limited to the space that would have been required for a "composite aisle" to accommodate all of the seating configurations.

Figure 4:
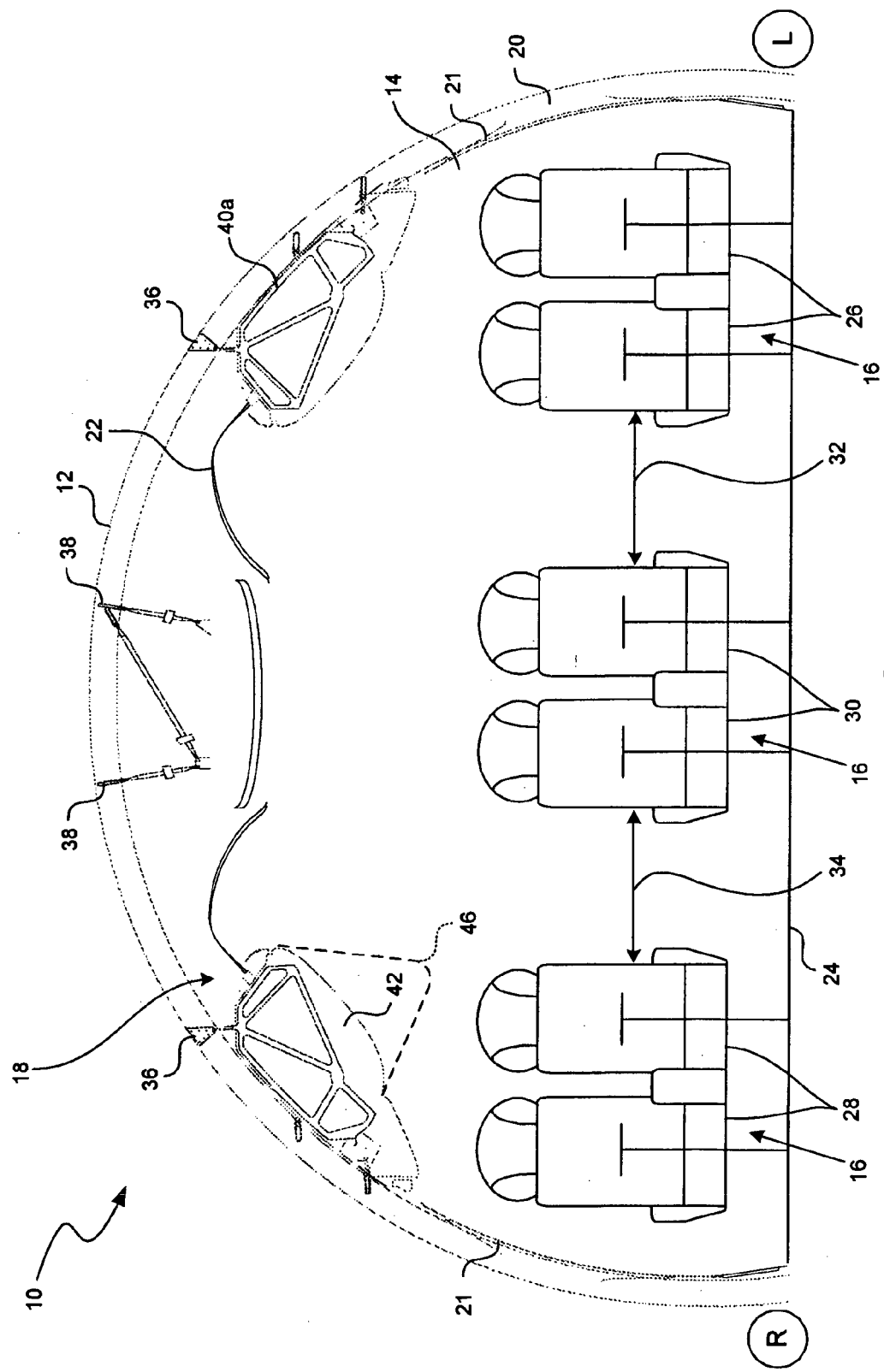
FIG. 4 is an enlarged partial cross-sectional view similar to FIG. 2, with the modular overhead stowage bin system in another configuration above another seat-row arrangement.

As indicated above in reference to FIG. 3, the stowage bin system 18 can be configured with the small bin modules 44 over the center seats 30 when the seats 16 are arranged in a 2-2-2 seat-row arrangement. The stowage bin system 18 also can have other configurations for the same seating arrangements. For example, FIG. 4 is an enlarged partial cross-sectional view of the aircraft 10 with the stowage bin system 18 in an alternate configuration. The seats 16 in the passenger cabin 14 are arranged in the 2-2-2 seat-row arrangement, as is typical for a business class or first class passenger cabin. The stowage bin system 18 can be configured with a plurality of the large bin modules 42 connected only to the outboard bin supports 36. No stowage bin assemblies 40 are attached to the center bin support 38, which results in a passenger cabin 14 with a very open and spacious feeling while still providing sufficient overhead stowage capacity. The modularity of the stowage bin system 18 provides the ability to use only the outboard stowage bin assemblies 40a and to eliminate the use of the inboard stowage bin assemblies 40b, thereby reducing the weight of the aircraft 10 and the cost of equipment installation.

The modularity of the stowage bin system 18 allows for additional stowage bin assemblies 40 to be easily installed along the center bin support 38, for example, when a first class cabin is converted to a business class cabin by providing more rows of seats in the 2-2-2 seat-row arrangement. If the seating arrangement is changed from the 2-2-2 seat-row arrangement to, as an example, the 24-2, the 2-5-2, the 3-2-3, or the 3-3-3 seat-row arrangement, the modularity of the stowage bin system 18 allows the large and small bin modules 42 and 44 to be easily removed and repositioned to desired locations on the outboard or center bin supports 36 and 38.

From the foregoing, it will be appreciated that specific embodiments of the invention have been described herein for purposes of illustration, but that various modifications may be made without deviating from the spirit and scope of the invention. As an example, a variety of the modular stowage bin assemblies can be used and can have different longitudinal dimensions while still being able to plug into selected positions along the outboard and center bin supports. Accordingly, the invention is not limited, except as by the appended claims.

We claim:

1. A method of reconfiguring an interior of an aircraft fuselage, comprising:

removing first stowage bin modules in a first configuration from a first bin support coupled to the aircraft fuselage, the first stowage bin modules having a first storage capacity;

removing second stowage bin modules in a second configuration from a second bin support coupled to the aircraft fuselage, the second stowage bin modules having a second capacity different than the first capacity, the second stowage bin modules in the first configuration being laterally apart from the first stowage bin modules, a first overhead aisle positioned between the first and second stowage bin modules, the first overhead aisle having first opposing edge portions;

attaching a plurality of first stowage bin modules to the second bin support in a second configuration; and attaching the plurality of second stowage bin modules to the first bin support in the second configuration, the second stowage bin modules being spaced laterally apart from the plurality of the first stowage bin modules, a second overhead aisle being positioned between the first and second stowage bin modules, the second overhead aisle having a second opposing edge portions shifted laterally in the same direction relative to the position of the first opposing edge portions of the first overhead aisle in the first configuration.

2. The method of claim 1, wherein attaching the first and second stowage bin modules includes attaching the first stowage bin modules having a first storage capacity greater than the second storage capacity of the second stowage bin modules.

3. The method of claim 1, further comprising providing a positioning plurality of seats in the interior of the aircraft fuselage in a first cabin configuration having a first seat-row arrangement when the first and second stowage bin modules are in the first configuration.

4. The method of claim 1, further comprising repositioning plurality of seats in the interior of the aircraft fuselage from a first cabin configuration having at least one of a 1-2-1, 2-4-2, and 2-5-2 seat-row arrangement to at least one of a 2-1-2, 2-2-2, 3-2-3, and 3-3-3 seat-row arrangement with the first and second stowage bin modules being in the second configuration.

5. The method of claim 1, further comprising repositioning plurality of seats in the interior of the aircraft fuselage from a first cabin configuration having at least one of a 2-1-2, 2-2-2, 3-2-3, and 3-3-3 seat-row arrangement to at least one of a 1-2-1, 2-4-2, and 2-5-2 seat-row arrangement with the first and second stowage bin modules being in the second configuration.

6. A method of configuring an interior of an aircraft fuselage, comprising:

coupling first stowage bin modules to the fuselage; the first stowage bin modules having a first storage capacity; and coupling second stowage bin modules to the fuselage, the second stowage bin modules having a second storage capacity different than the first storage capacity, the first and second stowage bin modules being positionable in first and second configurations, in the first configuration the first stowage bin modules being connected to the first bin support and the second stowage bin modules being connected to the second bin support, and the first and second stowage bin modules in the first configuration have a first overhead aisle positioned therebetween, the first overhead aisle having opposing edge portions spaced apart from each other, and in the second configuration the first stowage bin modules being connected to the second bin support and the second stowage bin modules being connected to the first bin support, and the first and second stowage bin modules in the second configuration have a second overhead aisle therebetween, the second overhead aisle having second opposing edge portions in a position shifted laterally relative to the position of the opposing edge portions of the first overhead aisle in the first configuration.

7. The method of claim 6, wherein attaching the first and second stowage bin modules includes attaching the first stowage bin modules having a first storage capacity greater than the second storage capacity of the second stowage bin modules.

8. The method of claim 6, further comprising attaching first and second bin support to the aircraft fuselage, removably attaching the first stowage bin assemblies to one of the first and second bin supports, and removably attaching the second stowage bin assemblies to the other one of the first and second bin supports.

* * * * *